(12) United States Patent
Gedritis et al.

(10) Patent No.: US 6,623,688 B2
(45) Date of Patent: Sep. 23, 2003

(54) GAS-ASSISTED TWO-SHOT INJECTION MOLDING PROCESS

(75) Inventors: David Anthony Gedritis, Grand Rapids, MI (US); Kevin Allen Bull, Cedar Springs, MI (US)

(73) Assignee: Cascade Engineering, Inc., Grand Rapids, MI (US)

( * ) Notice: Subject to any disclaimer, the term of this patent is extended or adjusted under 35 U.S.C. 154(b) by 212 days.

(21) Appl. No.: 09/894,761

(22) Filed: Jun. 28, 2001

(65) Prior Publication Data

US 2003/0001411 A1 Jan. 2, 2003

(51) Int. Cl.[7] .............................................. B29D 22/00
(52) U.S. Cl. ....................................... 264/513; 264/572
(58) Field of Search ................................. 264/513, 572

(56) References Cited

U.S. PATENT DOCUMENTS

| | | |
|---|---|---|
| 4,101,617 A | 7/1978 | Friederich |
| 4,201,209 A | 5/1980 | LeVeen et al. |
| 4,385,025 A | 5/1983 | Salerno et al. |
| 4,778,366 A | 10/1988 | Weaver |
| 4,792,425 A | 12/1988 | Weaver |
| 4,830,807 A | 5/1989 | Warren et al. |
| 4,993,931 A | 2/1991 | Belcher |
| 5,057,266 A | 10/1991 | Belcher |
| 5,251,954 A | 10/1993 | Vande Kopple et al. |
| 5,456,957 A | 10/1995 | Jackson et al. |
| 5,558,824 A | 9/1996 | Shah et al. |
| 5,566,954 A | 10/1996 | Hahn |
| 5,711,907 A | 1/1998 | Nozaki et al. |
| 5,799,385 A * | 9/1998 | Vecchiarino et al. .......... 29/469 |
| 6,143,237 A * | 11/2000 | Eckardt et al. ............. 264/572 |
| 2001/0050450 A1 * | 12/2001 | Kayano et al. ............. 264/513 |

* cited by examiner

Primary Examiner—Suzanne E. McDowell
(74) Attorney, Agent, or Firm—Warner Norcross & Judd LLP

(57) ABSTRACT

A process for injection molding a composite of rigid thermoplastic and soft thermoplastic, the soft thermoplastic including a cavity established with pressurized assist gas or an assist liquid. The process includes the steps of: injecting a hard molten thermoplastic into a first mold chamber; injecting a soft molten thermoplastic into a second mold chamber; establishing communication between the first chamber and the second chamber so that the rigid thermoplastic and soft thermoplastic integrally bond; and injecting an assist fluid into the soft thermoplastic to form a cavity. In a preferred embodiment, the formed composite is an automotive cowl where the rigid thermoplastic forms the rigid body portion of the cowl and the integrally bonded soft thermoplastic forms a compressible bulb seal.

12 Claims, 4 Drawing Sheets

GAS-ASSISTED TWO-SHOT INJECTION MOLDING PROCESS

BACKGROUND

The present invention relates to injection molding a composite article including a rigid thermoplastic and a soft thermoplastic.

In many industries, it is desirable to combine the structural characteristics of a rigid thermoplastic with the sealing abilities of a soft and flexible thermoplastic. For example, in the automotive industry, a cowl—the transition trim part between the hood and windshield—typically includes a rigid piece of plastic and a soft, blade-like seal bonded to an edge of the rigid piece. The rigid piece forms the body of the cowl and is secured to a body panel of the automobile. The blade seal engages the hood, providing an interface between the cowl and the hood to prevent water from leaking into the engine compartment and to suppress engine noise.

Conventional rigid/soft thermoplastic composites such as cowls are made with a "two-shot" injection molding process. This process uses a mold that is initially separated by a retractable mold insert into two chambers—a body chamber corresponding to the body of the cowl, and a seal chamber corresponding to the blade seal. In the process, molten structural or "hard" thermoplastic is injected into and fills the body chamber. Next, the mold insert is retracted to expose an edge of the structural thermoplastic to the seal chamber. Then, a molten soft thermoplastic is injected into and fills the seal chamber, and simultaneously bonds to the exposed edge to form a rigid/soft thermoplastic composite cowl.

Although the resultant rigid/soft composite cowl includes the desired structural rigidity and sealing capability, it suffers a significant shortcoming. Due to repeated contact with the hood and exposure to excessive heat from the engine, the blade seal deforms from its original shape, and becomes incapable of satisfactorily engaging the hood to provide the required seal. This loss of sealing ability of the blade seal is common in many other rigid/soft thermoplastic composite applications as well.

In an unrelated field, pressurized gas conventionally is used to add rigidity to hard thermoplastic bodies. In one application, pressurized gas is injected into molten hard thermoplastic resin as the resin is injected into a mold. The gas pushes resin out of its way to form cavities within the hard resin. When the hard resin cools, the completed hard plastic body includes cavities that enhance the rigidity and structural strength of the body. This use of pressurized gas provides a way to increase rigidity of hard plastic bodies; however, many opportunities exist to use pressurized gas in novel applications.

SUMMARY OF THE INVENTION

The aforementioned problems are overcome in the present invention that provides a single mold injection process in which a rigid thermoplastic is bonded to a soft thermoplastic and pressurized assist gas is injected into the soft thermoplastic to establish a cavity and thereby form a compressible bulb seal.

In a preferred embodiment, the present invention generally includes the steps of: injecting a molten rigid thermoplastic into a first mold chamber; injecting a molten soft thermoplastic into a second mold chamber; establishing fluid communication between the first and second mold chambers so that the rigid and soft thermoplastics bond to one another along an edge; and injecting pressurized assist gas or liquid into the soft thermoplastic to establish a cavity in the soft thermoplastic. Preferably, the pressurized gas pushes molten soft plastic out of the gases' way and the space occupied by the gas forms the tube-like cavity through the soft plastic. After the thermoplastics cool, the resultant composite is removed from the mold. With the cavity formed in the soft thermoplastic, the soft thermoplastic portion of the composite forms a compressible and resilient seal with a cross section resembling a light bulb—hence the name "bulb seal."

The present inventive process provides an efficient and economical way to integrally bond a rigid thermoplastic to a soft thermoplastic that includes a bulb seal in a single mold process. With the process, resilient bulb seals may now be integrated into a variety rigid/soft thermoplastic composite articles including automotive trim pieces, such as cowls, doors and door jambs; household appliance trim; construction materials, such as doorways and windows; and the like. Accordingly, these composite articles offer improved sealing capabilities because the integral bulb seal is less prone to deformation over time due to repeated contact with an item against which it interfaces.

Additionally, the present invention provides a novel use of assist gas. Rather than use assist gas to make hard thermoplastic parts more rigid and strong, the present invention uses assist gas to make soft plastic bodies more supple and resilient.

These and other objects, advantages and features of the invention will be more readily understood and appreciated by reference to the detailed description of the preferred embodiments and the drawings.

DETAILED DESCRIPTION OF THE PREFERRED EMBODIMENTS

Figure 1:
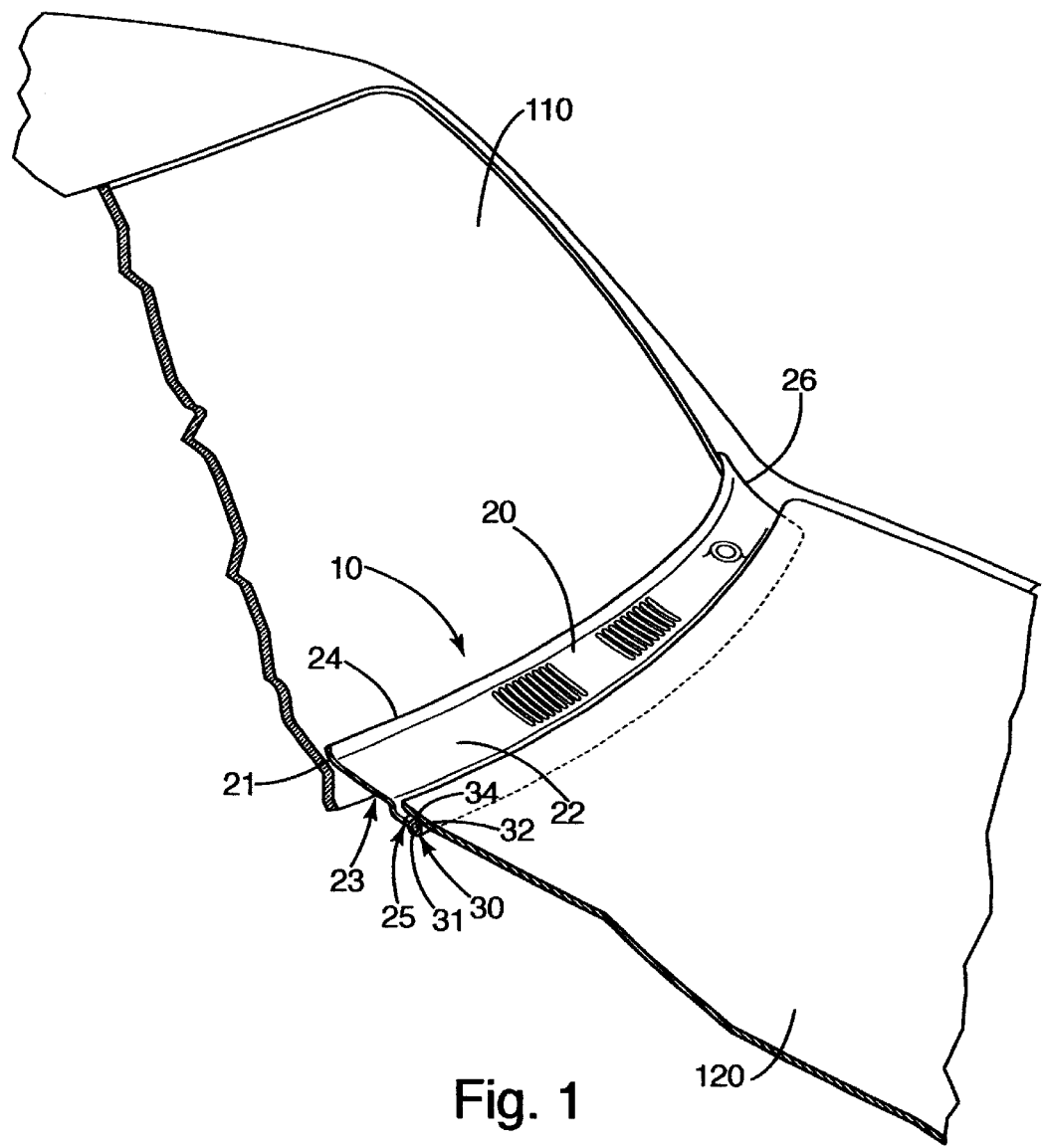
FIG. 1 is a sectional view of an automotive cowl composite formed according to a process of the present invention.

In the preferred embodiment, the present invention is described in connection with the manufacture of injection molded thermoplastic automotive trim cowls. With reference to FIG. 1, cowl 10, formed according to the process of the present invention, includes body 20 and bulb seal 30. Body 20 is constructed of a rigid or hard thermoplastic or resin and bulb seal 30 is constructed of a supple or soft thermoplastic or resin. The rigid thermoplastic 21 of the body 20 is integrally bonded to the soft thermoplastic 31 of the bulb seal 30 at interface 25. In a preferred embodiment, the hard thermoplastic or resin is polypropylene (PP) and the soft resin a thermoplastic elastomer (TPE).

Optionally, the hard thermoplastic may be any commercially available hard or rigid thermoplastic including but not limited to the following: polyethylene (PE), acrylonitrile-butadiene-styrene (ABS), polystyrene (PS), polycarbonate (PC), thermoplastic olefin (TPO), nylon (PA), polyacetal (PMMA), polyethylene terephthalate (PET), polybutylene terephthalate (PBT), acrylonitrile styrene acrylate (ASA), polybutylene terephalate (PBT) and polyester. Optionally, mineral, glass fiber or synthetic fiber-filled versions of rigid thermoplastic, including those above, may be used. Further, commercially available blends of rigid thermoplastic may be used, such as ABS-ASA, ABS-PA, ABS-PBT, and the like. The soft thermoplastic may be any commercially available soft or supple thermoplastic including but not limited to the following: thermoplastic polyurethane (TPU), polyvinyl chloride (PVC), thermoplastic olefin (TPO) and ionomers.

The cowl body 20 includes top surface 22, bottom surface 23, side edge 26 (opposite side edge 26 not shown), an elongated back edge 24 and an elongated front edge—not visible as it is coincident with the interface 25 of the rigid thermoplastic 21 and the soft thermoplastic 31. The elongated back edge 24 abuts the windshield 110 of the automobile.

With further reference to FIG. 1, the bulb seal 30 includes cavity or void 32 extending therethrough. As used herein, "bulb seal" refers to an article constructed of soft thermoplastic including an internal cavity of any size, shape or dimension formed using a gas or liquid assist process. The bulb seal 30 engages the hood 120 to form a seal when the hood 120 is in a closed position as depicted. Because bulb seal 30 is constructed of soft thermoplastic 31 and includes cavity 32 therein, it is compressible and resilient, and thereby capable of enduring repeated and continuous sealing engagement with the hood over the useful life of the vehicle without deforming.

Figure 2:
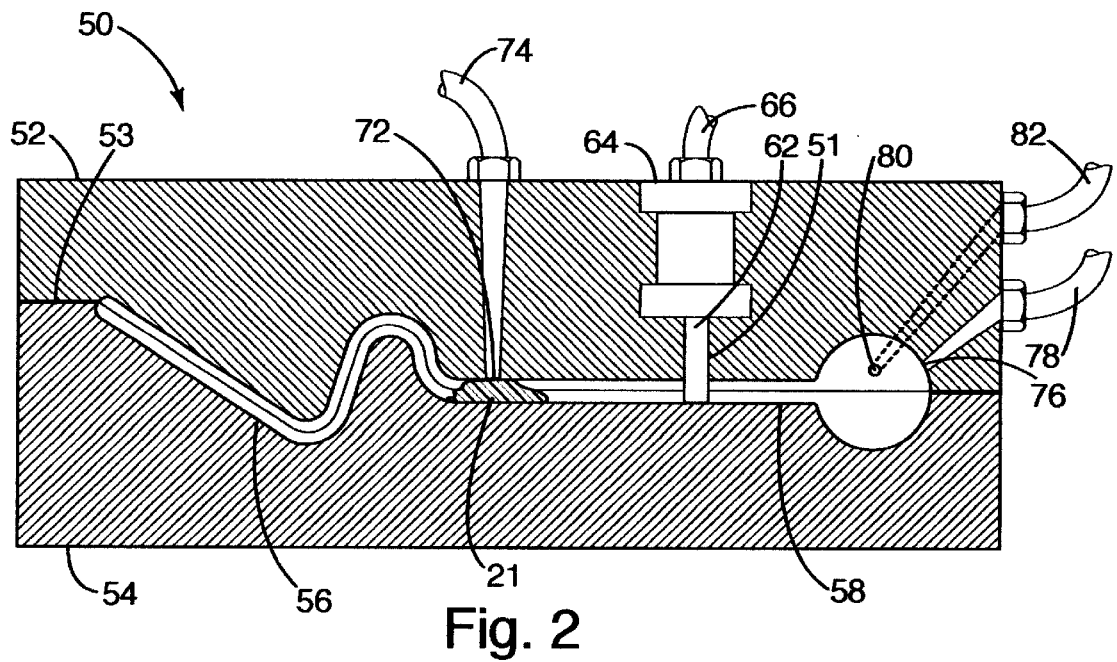
FIG. 2 is a sectional view of a mold used in the process of the present invention as hard thermoplastic is injected into the mold.

With reference to FIG. 2, the injection molding equipment 50 of the preferred embodiment will now be described. The injection molding equipment 50 generally includes upper 52 and lower 54 mold halves operatively movable between open (not shown) and closed positions with commercially available hydraulic, pneumatic, or electric systems. In the closed position, the upper 52 and lower 54 mold halves meet together along mold interface 53. The mold halves 52, 54 define first mold cavity 56 and second mold cavity 58.

A mold insert or slide core 62 is adapted to slide in channel 51, which is defined by the upper mold 52. Slide core 62 includes a block, plate or member which prevents materials in the first mold cavity 56 from communicating with materials in the second mold cavity 58 when it is in its extended or protracted position as depicted in FIG. 2. Optionally, the slide core is of any size, shape or dimension. The slide core 62 is movable from the protracted position shown in FIG. 2 to a retracted position shown in FIG. 4, preferably by a hydraulic cylinder 64. Hydraulic cylinder 64 is in fluid communication with a control pump (not shown) via hydraulic supply line 66. The hydraulic cylinder 64 is optionally controlled by a microprocessor (not shown) to move the slide core 62 as desired. Optionally, the slide core is moveable by any commercially available actuating mechanism, for example, an electric servo motor, pneumatic drive, gear drive, rack and pinion drive, or the like.

With further reference to FIG. 2, the upper mold 52 further includes rigid resin injection barrel 72, which is in fluid communication with a rigid resin supply (not shown) via supply line 74. The hard resin injection barrel is preferably located in the first mold chamber to deliver a shot or predetermined quantity of rigid or hard thermoplastic resin—in molten or liquid form—into the first mold chamber 56.

The upper mold 52 also includes a soft resin injection barrel 76, which is in fluid communication with a soft resin supply (not shown) via supply line 78. The soft resin injection barrel 76 is preferably located in the second mold chamber to deliver a shot of soft thermoplastic resin—in molten or liquid form—into the second mold chamber 58.

Additionally, a gas injection port 80 is disposed in the upper mold, in communication with second mold chamber 58 and further in communication with a gas supply (not shown) via gas supply line 82. The gas injection port is capable of injecting pressurized gas into the soft thermoplastic resin as that resin is injected from soft resin injection barrel 76 into the second mold chamber 58. Optionally, the gas injection port may be disposed in the lower mold. As will be appreciated by those skilled in the art, other gas injection systems may be substituted for the injection ports to inject gas into the mold. For example, the gas may be injected directly into a resin feed machine (not shown) used to deliver resin to the mold. Optionally, in cases where resin is injected through a runner system (not shown) into the mold, the gas may be injected directly into the runner system.

Preferably, the pressurized inert gas is nitrogen, however any commercially available assist gas may be used. Optionally, any commercially available assist liquid, for example water, may be used as well. In such an option, the assist liquid would be injected through the port 80 into the soft thermoplastic resin 31 and operate under principles similar to that of an assist gas. As used herein, assist fluid refers to any commercially available assist gas or assist liquid.

Additionally, temperature and pressure sensors (not shown) may be distributed throughout the upper and lower 52, 54 mold halves to monitor temperature and pressure within the chambers 56, 58 at preselected locations. These sensors can be employed with supply sensors (not shown) monitoring the amount of materials injected through the hard resin injection barrel 72, the soft resin injection barrel 76 and the gas injection port 80, to input information to a microprocessor (not shown) which consequently controls the injection molding process.

As will be appreciated, the hard resin injection barrel, soft resin injection barrel, gas assist injection port 80, slide core 62 and hydraulic cylinder 64 may be disposed in any combination in either the upper 52 or lower mold 54. Optionally, additional molds and slide cores may be combined with the upper 52 and lower 54 molds to create the desired configuration of the hard resin/soft resin composite. Further, a commercially available cooling system may be integrated into the upper 52 and lower 54 molds to facilitate cooling of injected resins.

Method of Manufacture

Figure 3:
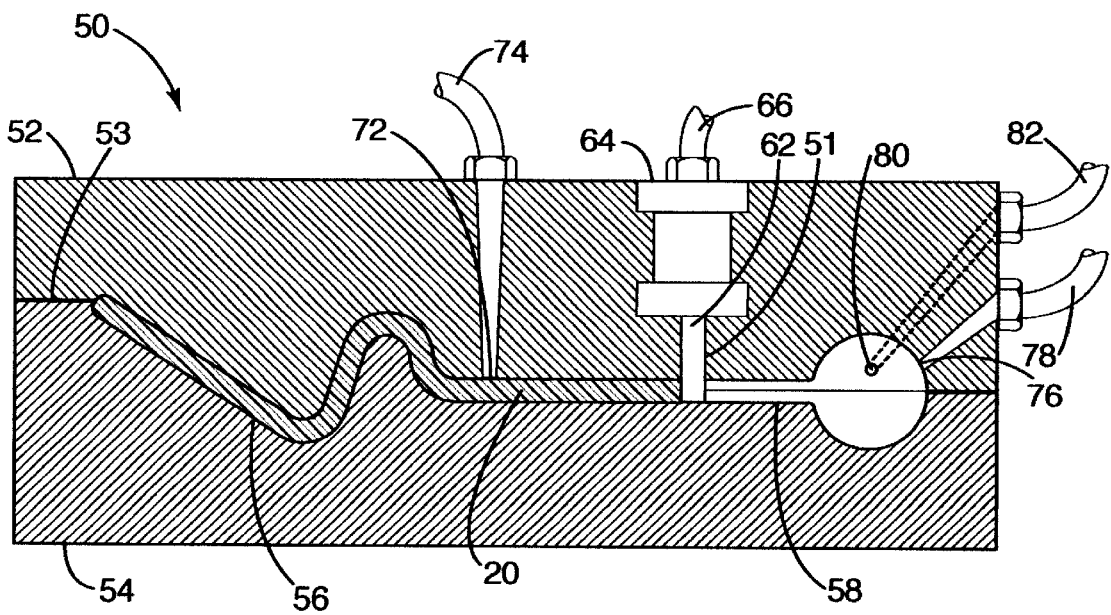
FIG. 3 is a sectional view of the mold when the hard thermoplastic has been injected into the mold.

Referring now to FIGS. 2–6, the preferred process of the invention will now be described in connection with the manufacture of injection molded thermoplastic automotive trim cowls. When the slide core 62 is moved to its protracted position as depicted in FIG. 2, the mold halves 52, 54 are clamped together with suitable clamping pressure to define first mold chamber 56 and second mold chamber 58. The first mold chamber 56 corresponds to the rigid body of the cowl and the second mold chamber corresponds to the bulb seal of the cowl. At this time, a first molten thermoplastic resin, preferably a rigid thermoplastic 21 is injected into the first mold chamber through to hard resin injection barrel 72 until the first mold chamber 56 is satisfactorily filled as depicted in FIG. 3.

Figure 4:
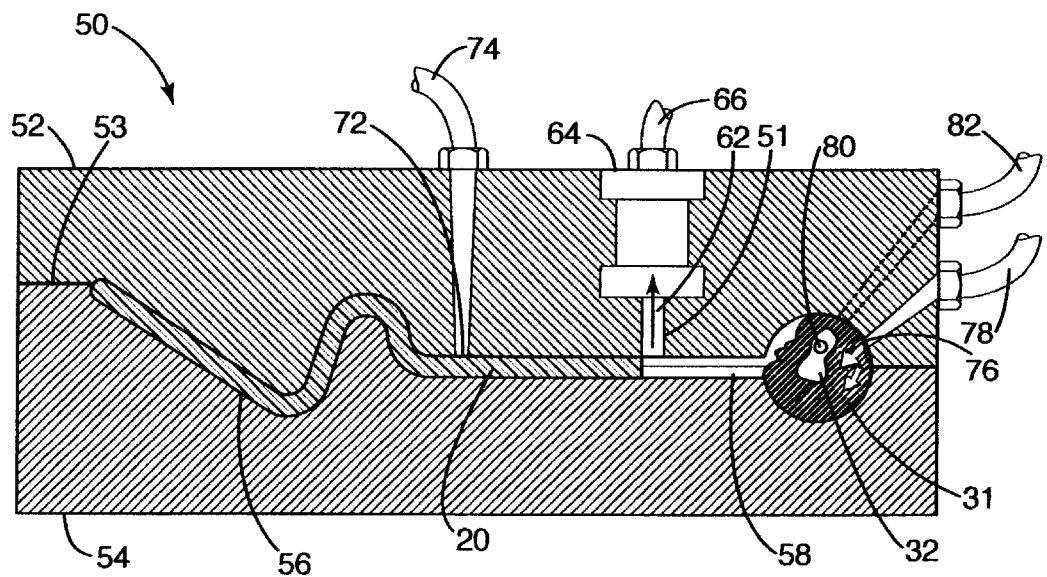
FIG. 4 is a sectional view of the mold as a core is retracted and soft thermoplastic is injected into the mold.

With reference to FIG. 4, the clamping pressure between the upper 52 and lower mold halves 54 may then be relieved. The slide core 62 is then retracted in the direction as indicated by the arrow by hydraulic cylinder 64 into the channel 51 to expose the rigid thermoplastic body 20, which still may be partially molten, to the second mold chamber 58.

With further reference to FIG. 4, after the slide core 62 is retracted, the upper and lower molds 52, 54 are again clamped together with pressure. As will be appreciated, this may not be necessary if pressure between upper and lower mold halves is not relieved. A soft thermoplastic resin shot is injected through soft thermoplastic resident barrel 76 into the second chamber 58. Almost simultaneously, pressurized assist gas from a gas supply (not shown) is pumped through line 82 and into the second mold cavity 58 via gas injection port 80.

Figure 5:
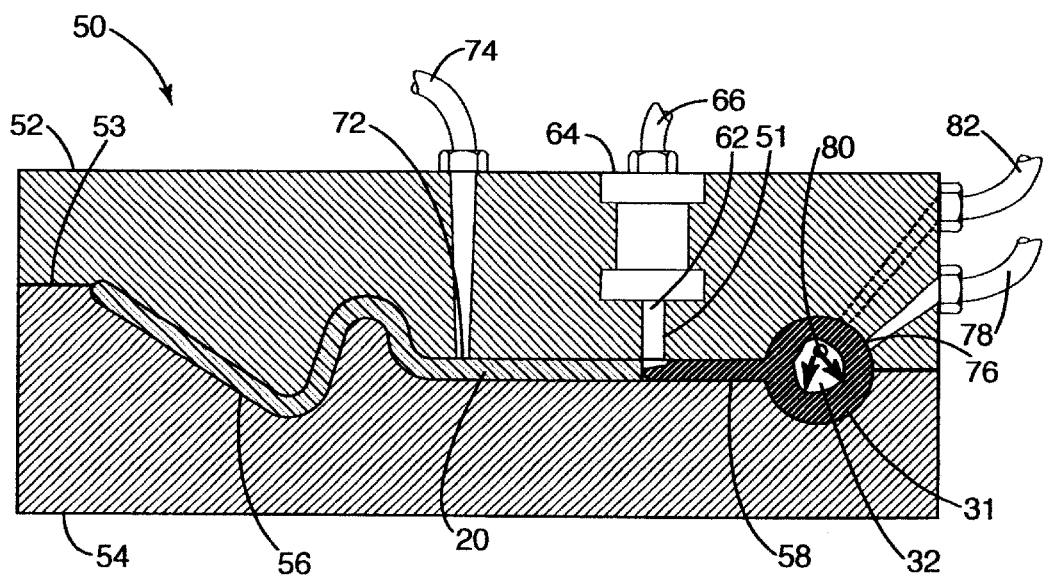
FIG. 5 is a sectional view of the mold as pressurized assist fluid is injected into the soft thermoplastic.

With reference to FIG. 5, the soft resin shot 31 continues to pump into the second mold chamber 58 through soft resin injection barrel 76. As the soft resin fills the second mold chamber 58, the innermost portion of the soft resin 31 remains heated and viscous. Accordingly, when pressurized assist gas is injected into the second mold chamber 58 via gas injection port 80, the gas pushes the soft thermoplastic resin 31 outwards (as depicted by the arrows) to form an expanding cavity 32.

As further depicted in FIG. 5, the soft thermoplastic resin 31 begins to fuse and integrally bond to the rigid thermoplastic 20 at interface 25. Injection of the soft thermoplastic 31 and pressurized assist gas into second mold cavity 58 continues at a rate and for a duration of time experimentally determined until the cavity 32 is expanded to desired dimensions and the soft thermoplastic resin 31 bonds to rigid thermoplastic 20 along interface 25. Optionally, assist liquid, rather than assist gas, may be injected into the soft thermoplastic 31 to form the cavity 32. In another step, the soft thermoplastic is allowed to cool.

Figure 6:
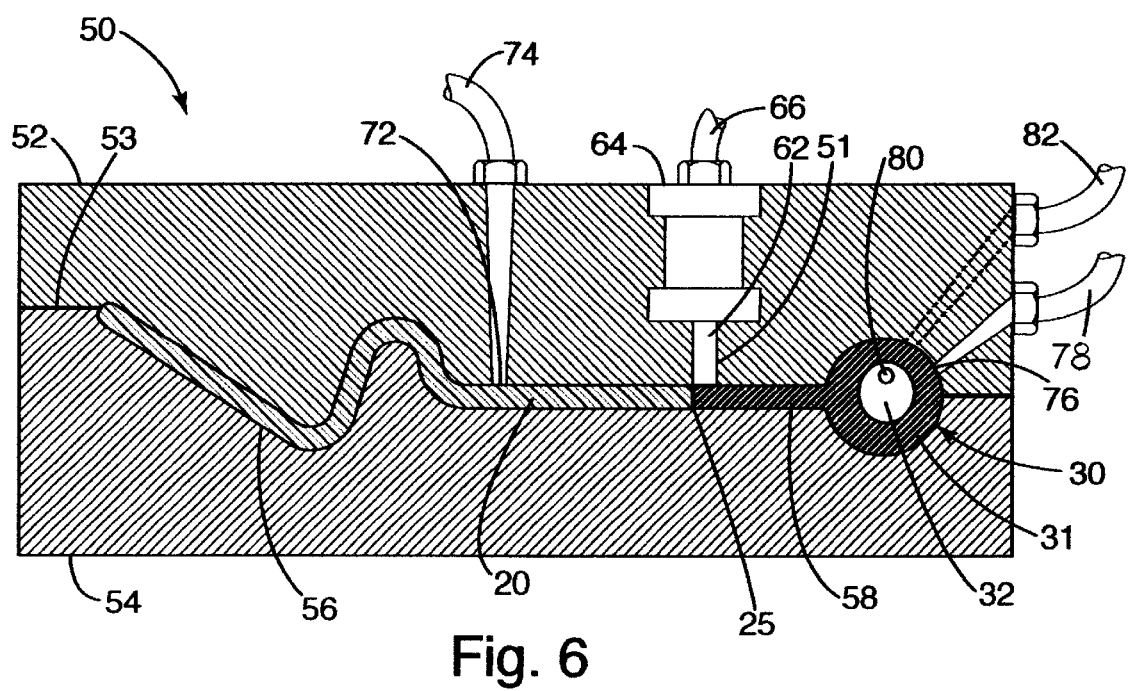
FIG. 6 is a sectional view of a completed composite cowl within the mold.

Upon cooling, the soft thermoplastic resin 31 is fully bonded with interface 25 to the rigid thermoplastic 20 as depicted in FIG. 6. Cavity 32 is formed so that the soft thermoplastic 31 defines a bulb seal 30. At this point, any excess pressure within the cavity 32 caused by the pressurized assist gas or assist liquid therein may be relieved through an exhaust port (not shown) or back through assist gas injection port 80. After cooling and release of pressure from the cavity 32, the clamping pressure is relieved, and the mold halves 52, 54 are separated. The completed cowl is removed from the mold halves 52, 54.

The completed cowl is composite in nature, including rigid thermoplastic body 20 and soft thermoplastic bulb seal 30, which is bonded at interface 25 to the rigid thermoplastic body 20. The completed cowl preferably has an appearance of cowl 10 as depicted in FIG. 1

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A process for fluid-assist injection molding and composite article comprising the steps of:
   providing a mold;
   injecting a shot of hard thermoplastic resin in molten form into the mold;
   injecting a shot of soft thermoplastic resin in molten form into the mold, a first portion of the soft thermoplastic resin bonding to the hard thermoplastic resin, a second portion of the soft thermoplastic resin having a viscous interior; and
   injecting assist fluid into the heated viscous interior to establish a cavity in the second portion of the soft thermoplastic resin.

2. The process of claim 1 comprising the step of allowing the hard thermoplastic and soft thermoplastic to cool and solidify.

3. The process of claim 2 wherein the hard thermoplastic is polypropylene and the soft thermoplastic is a thermoplastic elastomer.

4. The process of claim 1 wherein the mold defines a first chamber and a second chamber selectively separated by a core slide.

5. The process of claim 4 wherein the core slide is moveable between a protracted position and retracted position.

6. The process of claim 5 wherein the soft thermoplastic is prevented from bonding to the hard thermoplastic when the core slide is in a protracted position and wherein the soft thermoplastic and hard thermoplastic bond to one another when the core slide is in a retracted position.

7. A process for injection molding a composite article comprising the steps of:
   injecting a hard thermoplastic into a first mold chamber;
   injecting a soft thermoplastic into a second mold chamber;
   establishing communication between said first mold chamber and the second mold chamber so that the hard thermoplastic and soft thermoplastic bond to one another; and
   introducing a pressurized gas into said soft thermoplastic whereby a cavity is formed in the soft thermoplastic.

8. The process of claim 7 wherein the soft thermoplastic with the cavity therein forms a bulb seal.

9. The process of claim 8 wherein the hard thermoplastic is chosen from the group consisting of: polypropylene, polyethylene, acrylonitrile-butadiene-styrene, polystyrene, polycarbonate, thermoplastic olefin, nylon, polyacetal, polyethylene terephthalate, polybutylene terephthalate, acrylonitrile styrene acrylate, polybutylene terephalate and polyester.

10. The process of claim 7 wherein the first and second mold chambers are selectively separated by a retractable mold insert.

11. The process of claim 10 wherein said establishing step includes retracting the mold insert.

12. The process of claim 7 wherein the soft thermoplastic is chosen from the group consisting of thermoplastic elastomer, thermoplastic polyurethane, polyvinyl chloride, thermoplastic olefin and ionomers.

* * * * *